United States Patent Office 3,230,321
Patented Jan. 18, 1966

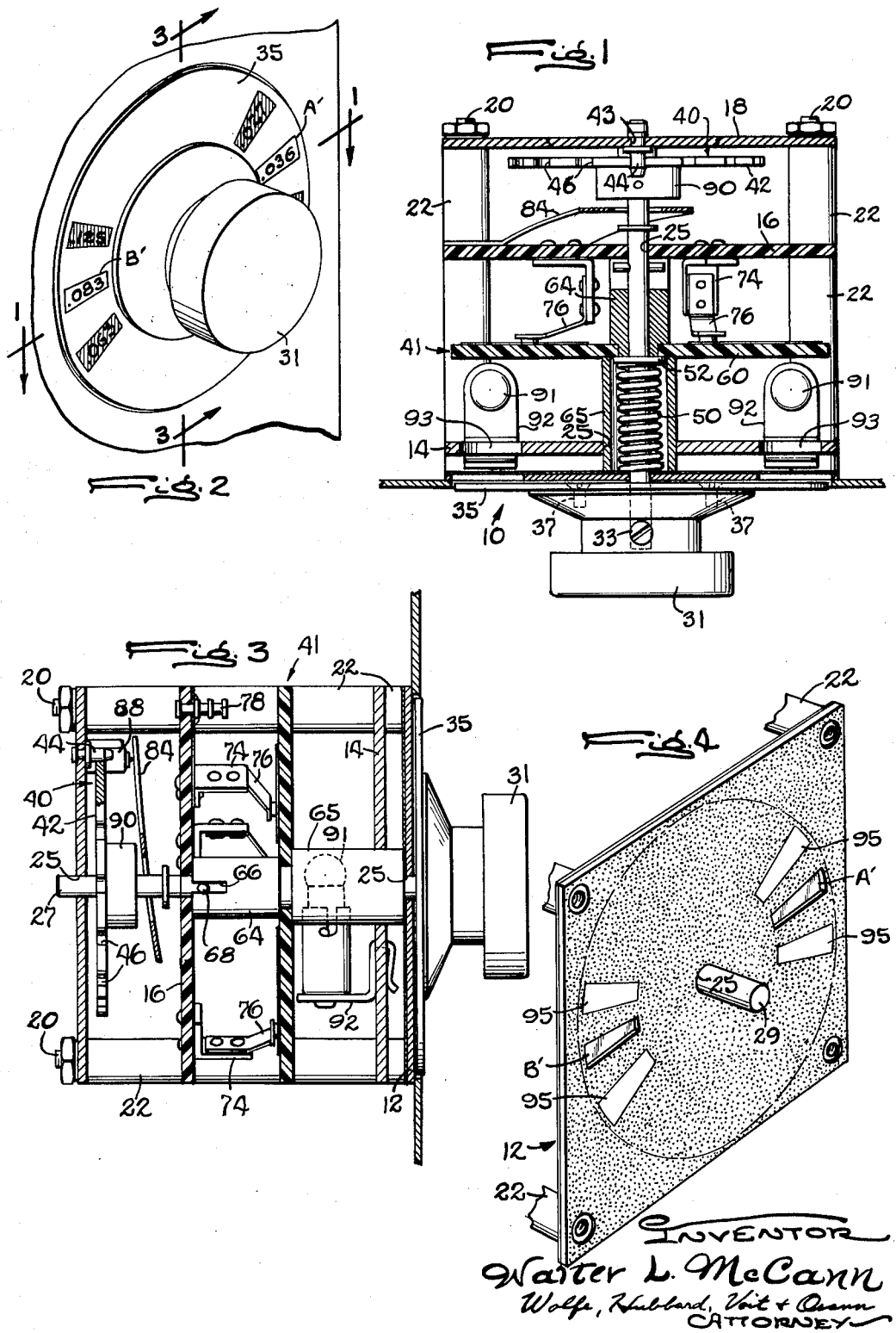

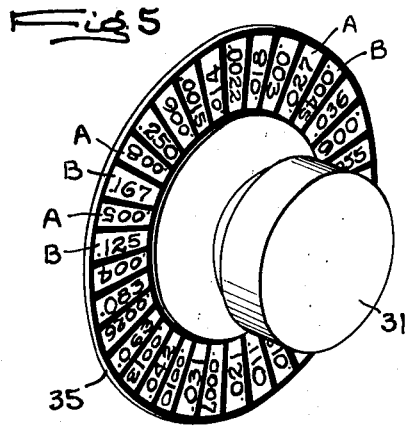
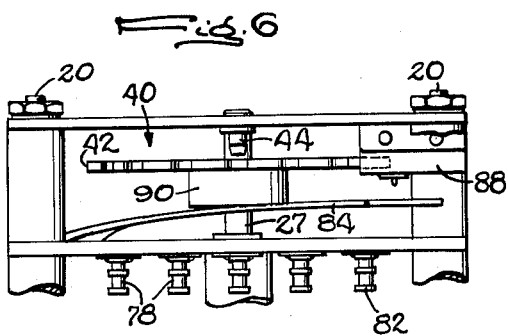
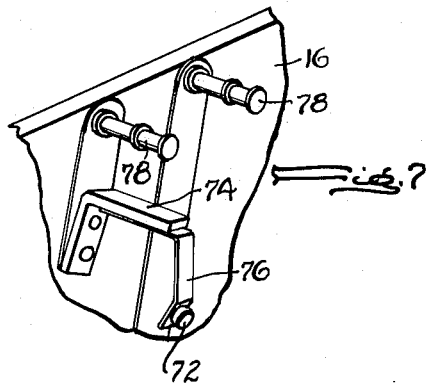
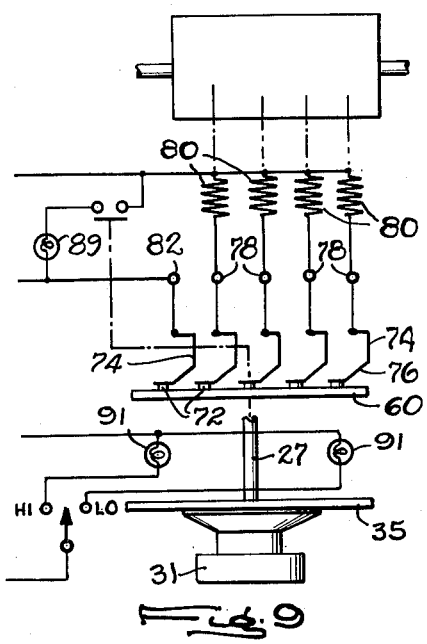
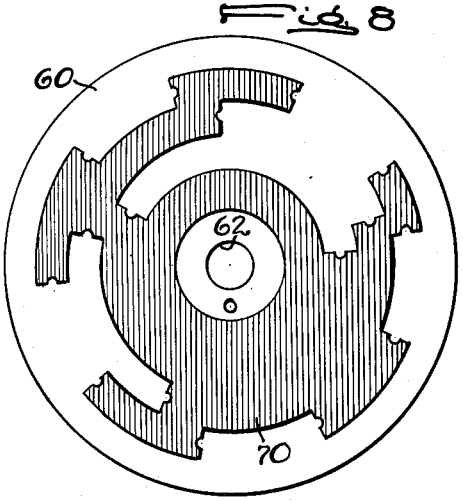

3,230,321
ROTARY SELECTOR SWITCH FOR SELECTING FEED RATES AND SPINDLE SPEEDS OF MACHINE TOOLS
Walter L. McCann, Fond du Lac, Wis., assignor to Giddings & Lewis Machine Tool Company, Fond du Lac, Wis., a corporation of Wisconsin
Filed Sept. 1, 1961, Ser. No. 135,478
4 Claims. (Cl. 200—11)

The present invention relates generally to rotary selector switches and, more particularly, to a rotary selector switch adapted for utility in selecting feed rates and spindle speeds of a machine tool such, for example, as a horizontal boring, drilling, and milling machine.

It is a general object of the present invention to provide an improved selector switch which is distinguished by its simplicity of construction and facility of operation such that a machine tool operator may, with a virtual "twist" of the wrist, select a desired spindle feed rate for one or more spindle speeds.

Another object of the present invention is to provide an improved rotary selector switch which permits the selection of a wide number of alternative positions in at least two ranges at the instance of the operator while accomplishing the same with a single circular dial which illuminates, for visual clarity, both the position selected and the range as well as adjacent alternative positions for the particular range.

A further object of the invention is to provide a rotary selector switch of the character set forth and which, for versatility and compactness, takes advantage of a modified form of printed circuit selectively positioned by movement of the switch dial of completion of one or more electrical paths, or combinations thereof, which, when energized, will provide the result prescribed by the selected illuminated position registered on the dial. A related object is to provide an improved selector switch embodying the features described and wherein additional versatility is achieved by the substitution of any one of a number of alternative printed circuits to provide alternative electrical paths, or combinations thereof, which substitution may be quickly accomplished, with minimal effort and skill required.

Still another object of the present invention is the provision of an improved rotary selector switch having, in addition to its other salient features, a reminder device which is energized by the switch each time the dial setting is changed, thus reminding the operator continuously that another position has been selected.

The preceding, and other objects and advantages of the present invention, will become apparent from the following detailed description of the rotary selector switch and one environment in which it has particular utility, when taken with the drawings, wherein:

FIGURE 1 is a sectional view of the rotary selector switch taken along the plane of line 1—1 of FIG. 2, which illustrates and exemplary embodiment of the present invention;

FIG. 2 is a perspective view of a portion of the face of the selector switch of the present invention;

FIG. 3 is a sectional view of the selector switch taken in the plane of line 3—3 of FIG. 2;

FIG. 4 is a perspective view of the face plate of the selector switch illustrating a particular construction thereof;

FIG. 5 is a perspective view of the face of the dial of the selector switch showing an exemplary arrangement of the dial position;

FIG. 6 is an enlarged fragmentary sectional view of the rear portion of the selector switch illustrating one embodiment of an indexing means and a reminder device of the present invention;

FIG. 7 illustrates an enlarged section of the contact board showing one construction of the contact elements of the selector switch;

FIG. 8 is an enlarged frontal view of the rotor illustrating a representative printed circuit, and FIG. 9 is a schematic representation of an embodiment of the invention shown in an environment in which it has utility.

While the invention is susceptible of various modifications and alternative constructions, a certain illustrative embodiment has been shown in the drawings and will be described below in considerable detail. It should be understood, however, that there is no intention to limit the invention to the specific form disclosed, but, on the contrary, the intention is to cover all modifications, alternative constructions and equivalents falling within the spirit and scope of the invention as expressed in the appended claims.

Referring more particularly to the drawings, one illustrative embodiment of the invention is there shown in the form of a rotary selector switch 10. In this instance, the switch 10 comprises a frontal or face plate 12, a forward support plate 14, a contact board 16 of insulating material, and a rear support plate 18, all of which are mounted in axially spaced relation upon a plurality of posts 20 (FIGS. 1 and 3). The position of each such member relative to its adjacent member is determined by means of cylindrical spacers 22, adapted to be stacked on the posts 20 intermediate the members mounted thereon.

Each of the plates 12, 14 and 18 and the contact board 16 has a centrally located hole 25, and these members are arranged with such holes coaxial. A shaft 27 is rotatably received in the holes 25, passing through each and extending beyond the length of the switch. End portion 29, which protrudes beyond the face plate 12, has a turning knob 31 secured thereto by any appropriate means, such as setscrew 33. A circular translucent dial 35, having control indicia marked thereon, is positioned intermediate the knob and the frontal plate and is secured to the knob by screws 37. An indexing device, generally indicated at 40, functions to allow the dial to be moved in predetermined angular increments and provides accurate preselectable dial positions between increments. A rotor 41, in this case a single disc, is mounted on the shaft 27 between the forward support plate 14 and the contact board 16 for coaction with the latter.

An illustrated, the indexing device 40 comprises an indexing disc 42 having a central hole 43 and mounted on the shaft 27 for rotation therewith in a position transverse to the shaft. In the particular embodiment shown, the indexing disc 42 is located intermediate the rear contact board 16 and the end plate 18, nearest the end plate. An indexing pin 44 is rigidly positioned parallel with the shaft 27 and radially outwardly thereof on the end plate 18. The indexing pin 44 is adapted to be partially received in a plurality of semicircular indentations 46 formed on the other peripheral edge of the index disc 42. The length of the pin is such that by withdrawing the shaft a small distance, say ⅛″, by pulling the knob 31 axially to the right, as seen in FIG. 3, the index disc 42 is free of the pin 44 and the shaft, knob, dial, and wheel may be rotated at will. By returning the shaft to its normal axial position, a selected indentation 46 is engaged with the pin 44 and the shaft is secured against rotation.

In order to obviate the necessity of the operator's pushing the knob inward to lock the shaft each time a new selection is made, a spring 50 is provided, here shown encircling the shaft 27, which is under slight compression when the indexing disc 42 is engaged with the pin 44. One end of the spring, which passes through hole 25 of the forward support plate 14, bears against face plate 12. The other end is held in a spring retainer 52, which in turn is held to the shaft by mean such as a clip ring and the compression force of the spring.

The rotor 41 comprises a disc 60 of material such as Bakelite, which is a good electrical insulator. The disc 60 has a central aperture 62, and a tubular member 64 rigidly fixed thereon in alignment with the aperture 62, for slidably receiving the shaft 27. The rotor is mounted in the switch by first slipping a tubular sleeve 65 over the spring 50 and abutting against face plate 12. The sleeve 65, so positioned, acts as a guard for the spring as well as a means of positioning the rotor on the shaft. The rotor is then mounted on the shaft with its tubular member 64 in bearing relation therewith and extending towards the rear of the switch. The contact board 16 is then mounted on the corner posts 20 immediately adjacent the end of the member 64 in a position established by spacers 22.

For the purpose of connecting the rotor 41 to the shaft for rotation therewith and facilitating its ready interchangeability with other rotors, a pair of opposed diametrical slots 66 is formed in the tubular member 64 and a pin 68 is forced through the shaft 27 so that it engages the tubular member 64 in the slots 66. The slots extend longitudinally along the member 64 to allow the shaft to move longitudinally without affecting the position of the rotor.

As illustrated particularly in FIG. 8 of the drawings, a conductive plate 70 is electrically deposited or otherwise impressed upon the rotor 41, in this present instance upon selected areas of the rearward facing surface of the disc 60.

It should be borne in mind, however, that scope of the invention embraces the use of such conductive plates on selected areas on either or both sides of the rotor, and, in fact, the use of one or more rotors serially spaced on the shaft 27. Although the plate 70 is of unitary form, it is actually defined by a series of concentric rings, each circumferentially interrupted in accordance with the ultimate switching program to be developed.

A plurality of contact elements 72 (FIGS. 1, 3 and 7) is mounted on the contact board 16 by means of brackets 74, to which biasing springs 76 are riveted. The biasing springs 76 urge the elements 72 into contact with the rotor 41 and its disc 60. They are so arranged on the contact board 16 that each element contacts one of the concentric rings on the rotor. The elements 72, by means of spring 76 and mounting brackets 74, all of which are electrically conductive, are connected through terminals 78 to a plurality of corresponding relays or solenoids 80. One terminal 82 is connected to one side of a source of electrical power 89 (FIG. 9). The circuit continues from the terminal post 82 to its bracket associated mounting 74, its spring 76, and its contact element 72. In most instances, the concentric ring corresponding to that particular contact element will be in electrical contact with the remainder of the plate 70 throughout the entire 360° rotation of the rotor. In this manner, as the plate 70 is positioned relative to the contact elements 72, a completed electrical circuit to certain of the elements will be achieved, leaving open circuits at those elements which do not touch the plate 70 in that particular position. The closed circuit through the elements which are in contact with the plate 70 continues through a corresponding relay or solenoid and thence to the opposite side of the power source 89, effecting some control result, or co-operating with other solenoids to achieve a control result, as, for instance, shifting of a transmission.

In order to minimize the danger of the operator's forgetting that he has changed the position on the switch before he is ready to begin the particular operation requiring the change, a reminder device is built into the switch and is automatically energized thereby each time the switch dial is pulled out to change the dial setting.

An exemplary means of energizing such a device in cooperation with the switch is shown in FIGS. 3 and 6, and comprises a leaf spring 84 having one end thereof firmly attached to the switch, for example, by mounting the same on a post 20, or possibly by riveting the same to the contact board 16. The spring 84, which extends rearward, away from the contact board 16, in its relaxed position, is shown as having an elongated slot 86 through which the shaft 27 is passed, and the free end of the spring is positioned to bear against the contacts of a microswitch 88.

The microswitch is internally biased toward a closed position and when the dial is in its normal or inner position, the switch is adapted to be held open by the spring 84. When the dial is pulled axially forward, a protruding hub 90 of the index disc 42 comes into contact with the spring 84, urging the same toward the contact board 16 and away from the microswitch 88. The microswitch is allowed to close, and thereby complete an electrical circuit to a reminder device which may assume various forms, as, for example, a flashing light 89.

The versatility which characterizes the improved switch is greatly enhanced by the particular construction and arrangement of the translucent dial 35, a more interesting aspect of which is found in the placement of the stations or positions indicated on the dial (best viewed in FIG. 5) and here designated in two groups by the letters A and B. The dial positions total 32 (comprising two groups of 16 each) in the particular embodiment shown corresponding to 16 indentations on the index disc, and comprise a range of decimal numbers imprinted upon the translucent dial corresponding here to spindle feed rates. The dial is arranged so that the numerals of group A are upside down relative to group B.

Opposite the dial 35, on the frontal plate or face plate 12 appear two diametrically opposed slots A' and B' (FIG. 4). The slots are adapted to be illuminated by lamps 91 positioned on the rearward side of the face plate opposite the slots, by an appropriate means, such as clips 92. The latter in this instance are attached to the front support plate 14 and their lamps 91 illuminate the slots in the face plate 12 via openings 93 in the support plate 14 (FIG. 1). Each lamp, when energized, serves to illuminate those indicia on the dial in register with the associated slots in the face plate, thus indicating the particular speed range in which the spindle is presently operating. However, it is clear that any one of a series of functions could be wired to the lamps and the switch employed to command a corollary function for any one of the series.

Assume, for example, that in the embodiment shown, the spindle was in the low speed range, which was electrically connected to the left-hand lamp. The slot A' would be illuminated, visually emphasizing the series of positions A, readable in the right-side-up position only at slot A' and representing the series of feed rates appropriate for the low speed range of the spindle. The operator is thus provided with a highly visible and easily readable method of selecting alternative corollary functions, such as speed and feed rate of the spindle.

The face plate, which is preferably dark in color, for contrast, is provided with an additional feature of a pair of light colored insets 95 spaced on opposite sides of the slots A' and B' (FIG. 4). The insets are adapted to facilitate the reading of the next station in each series A and B on either side of the presently selected position.

Thus, a rotary selector switch is provided which incorporates all of the objects and advantages enumerated throughout the preceding description.

I claim as my invention:

1. A rotary switch having a plurality of selectable positions for controlling a machine tool within at least two ranges of operation, said switch comprising, in combination, a face plate having a pair of spaced apart illuminated slots, a front support plate, an insulated contact board having a plurality of contact elements thereon, a rear support plate, means for holding said plates and said contact board in axially spaced relation, a rotatable shaft extending through said plates and said contact board, a relatively translucent dial positioned adjacent said face plate and fixed on one end of said shaft for rotation therewith, said dial having two sets of control indicia alternately marked thereon corresponding respectively to selectable positions for two ranges of machine tool operation, the indicia of each set being registrable with a respective one of said illuminated slots, a first indexing element rigidly mounted with said dial and rotatable therewith, a second indexing element fixed to one of said plates and cooperable with said first indexing element for facilitating the alignment of a selected one of said positions on a selected dial with said illuminated slot, and means including a rotor mounted for rotation with said dial and having electrical conducting means impressed thereon, said electrical conducting means adapted to selectively contact a plurality of said contact elements of said contact board for making and breaking a plurality of electrical paths in accordance with the particular position selected on the dial.

2. A rotary switch as set forth in claim 1 wherein each said illuminated slot of said face place is flanked by a pair of illuminated insets spaced for registration with the next consecutive control indicia registrable with said illuminated slot.

3. A rotary switch having a plurality of selectable positions for controlling a machine tool within at least two ranges of operation, said switch comprising, in combination, a face plate having a first and second illuminated opening circumferentially spaced thereon, a front support plate, a contact board having a plurality of contact elements thereon, a rear support plate, spacer means for holding said plates and said contact board in axially spaced relation, a rotatable shaft extending transversely through said plates and said contact board, a translucent dial mounted on said shaft immediately adjacent said face plate, said dial having a first set of control indicia marked thereon and oriented for legibility upon registration with said first illuminated opening, said dial also having a second set of control indicia marked thereon in alternate series with said first set and oriented for legibility upon registration with said second illuminated opening, indexing means including a disc rigidly secured to said shaft, having a plurality of peripherally spaced indentations thereon, and an indexing pin extending from one of said plates and adapted to selectively engage a selected said indentation corresponding to a particular position of said dial for facilitating the alignment of a selected one of said control indicia with a reference to an illuminated slot, and means including an interchangeable rotor mounted for rotation with said dial and having a printed circuit impressed thereon, said printed circuit being effective to selectively contact a plurality of said contact elements for making and breaking a plurality of electrical paths through said switch in accordance with the selected indicia on said dial.

4. A rotary selector switch for selectively controlling a machine tool through a plurality of operating ranges, said switch comprising, in combination, a face plate having a plurality of diametrically opposed alternatively illuminated slots therein, a front support plate, an insulated contact board having a plurality of contact elements thereon, a rear support plate, spaced means for holding said plates and said contact board in axially spaced relation, the combination of a rotatable shaft extending transversely through said plates and said contact board, a translucent dial mounted on said shaft immediately adjacent said face plate, said dial having marked thereon a plurality of control indicia corresponding to selectable positions thereof, each of said selectable positions being spaced for selective alignment with a particular one of said plurality of diametrically opposed, alternatively illuminated slots on said face plate, indexing means including a disc rigidly secured to said shaft and having a plurality of peripherally spaced indentations thereon, an indexing pin extending from one of said support plates and adapted to selectively engage a given indentation corresponding to a particular position of said dial for facilitating the alignment of a selected one of said positions of said dial with a reference to an illuminated slot, means including an interchangeable rotor mounted on said shaft for rotation with said dial and having a printed circuit impressed thereon, said printed circuit being effective to selectively contact a plurality of said contact elements for making and breaking a plurality of electrical paths through said switch, means for permitting a limited axial movement of said shaft for alternatively engaging and disengaging said index disc and said pin whereby said dial may be rotated to a new position, and additional switch means mounted on one of said support plates and responsive to the axial movement of said shaft for actuating an external device for visually indicating a change of position has been made.

References Cited by the Examiner

UNITED STATES PATENTS

| 1,171,586 | 2/1916 | Brown | 200—166 |
| 1,300,665 | 4/1919 | Smith | 200—4 |
| 1,856,741 | 5/1932 | Austin | 200—4 |
| 2,541,892 | 2/1951 | Schulze | 200—167 X |
| 2,669,612 | 2/1954 | Johnson | 200—4 |
| 2,885,992 | 5/1959 | Roberts | 116—124.4 |
| 2,900,462 | 8/1959 | Thomas et al. | 200—11 |
| 3,030,848 | 4/1962 | Wick | 200—11 X |

KATHLEEN H. CLAFFY, *Primary Examiner.*

BERNARD A. GILHEANY, *Examiner.*